INVENTOR,
LAWRENCE MICHELS
BY
ATTORNEY

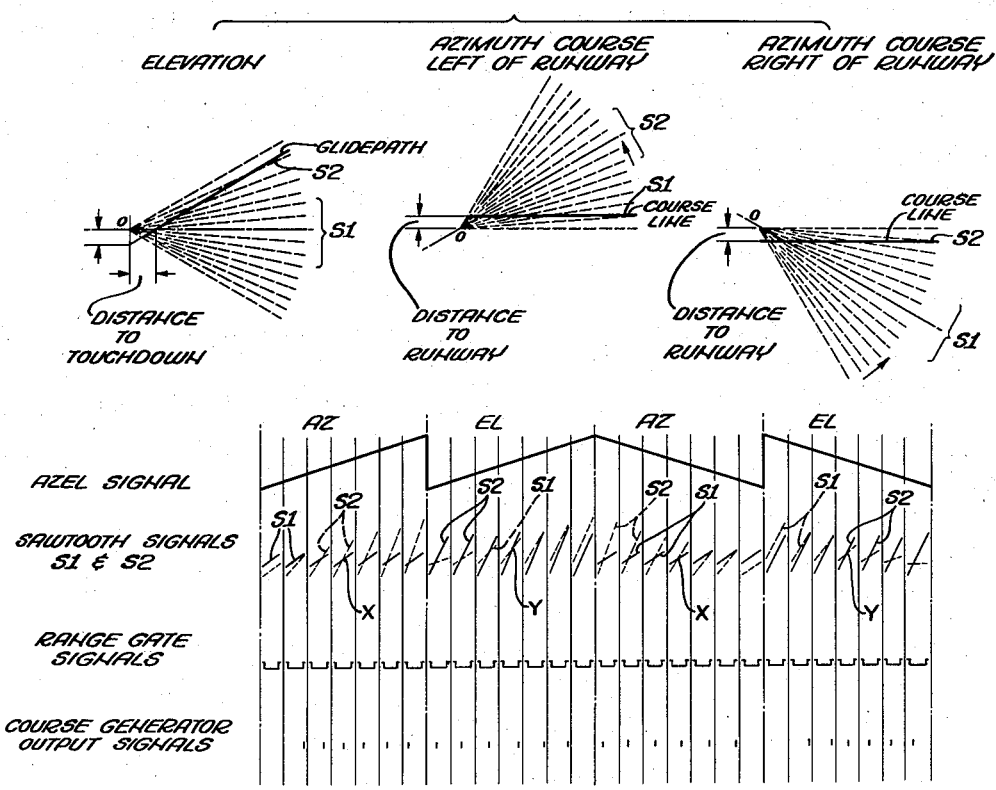
Fig. 1a.
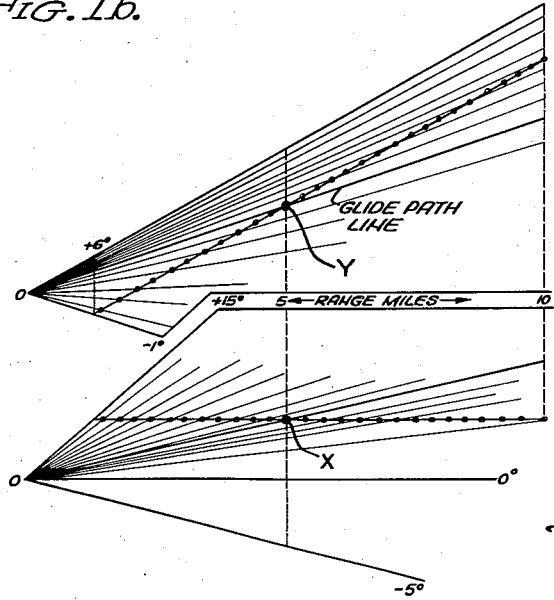
Fig. 1b.
Fig. 1c.
INVENTOR,
LAWRENCE MICHELS
BY
ATTORNEY

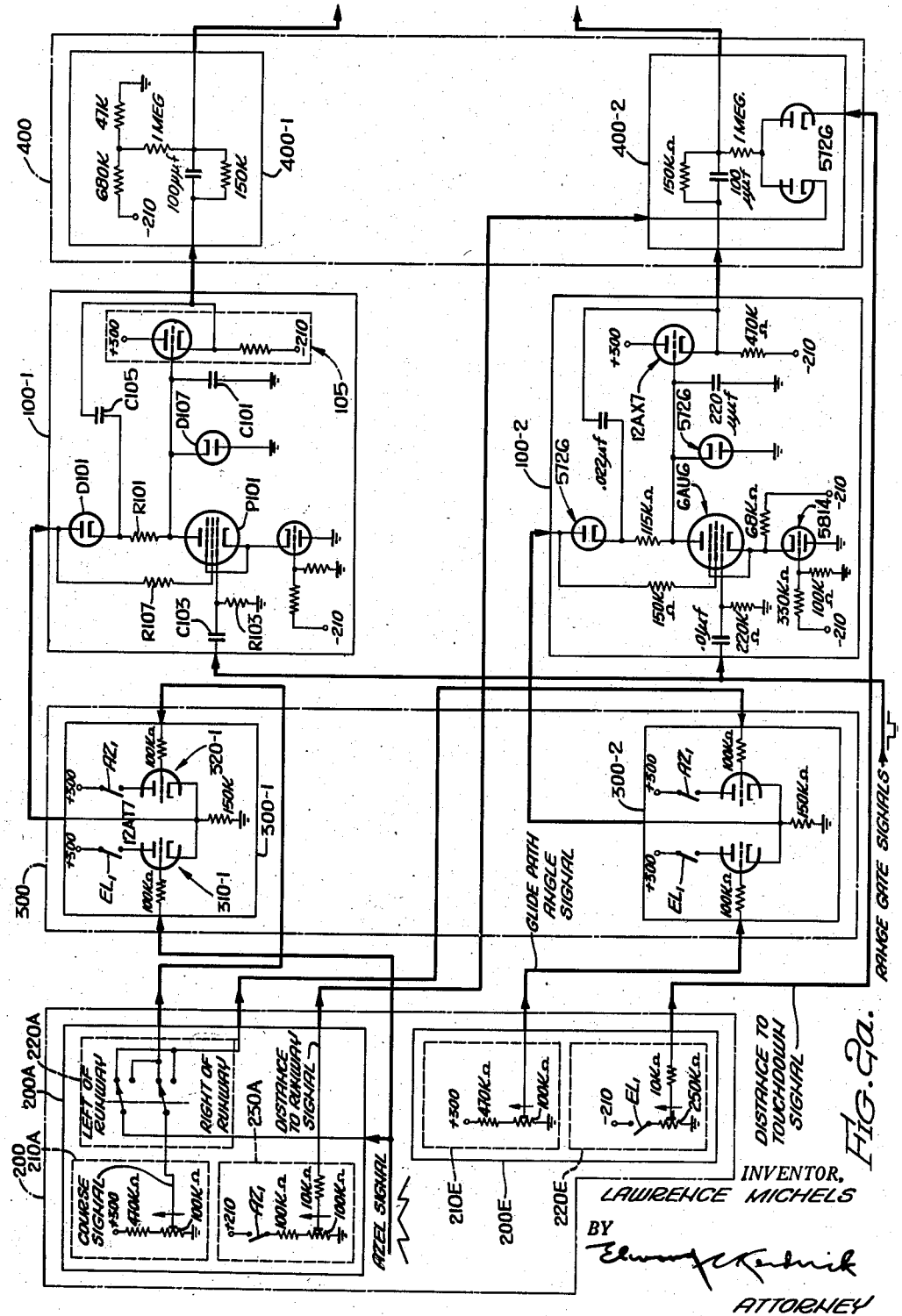

United States Patent Office 2,887,681
Patented May 19, 1959

2,887,681

DOUBLY VARIABLE SIGNAL COMPARISON METHOD AND APPARATUS FOR GENERATING PULSES REPRESENTING A CURSOR LINE

Lawrence Michels, Los Angeles, Calif., assignor to Gilfillan Bros. Inc., Los Angeles, Calif., a corporation of California Application January 31, 1955, Serial No. 484,997

13 Claims. (Cl. 343—100)

This invention relates to a doubly variable signal comparison method and apparatus for generating pulses representing a cursor line and, more particularly, to a method and electronic circuit for producing pulses during respective range-gated time intervals indicating corresponding points of a predetermined aircraft flight path; the pulses being derived through the time coincidence of two variable signals representing the predetermined flight path and a varying scan angle, respectively.

The basic technique of electronically generating cursor line indicating pulses is introduced in copending U.S. patent application Serial No. 222,511 for "Cursor Line and Map Generator" by David J. Green et al. filed April 23, 1951. According to the principles introduced in the copending application, the cursor line representing signals are generated by comparing a varying amplitude or sawtooth signal, having a time duration corresponding to a range-gated interval and a maximum amplitude corresponding to a scan angle position, with a signal of fixed amplitude representing a glide path or course line to be displayed electronically by means of a device such as a cathode ray tube. The cursor pulses are obtained in this manner through a pick-off circuit, performing the desired comparison, which produces an output pulse occurring at a time during the range-gated interval corresponding to the range of the respective cursor point for a particular scan angle.

The electronic technique of this copending application provides an important improvement over previously existing techniques in the art where the cursor line was physically provided on the respective display device. Thus a glidepath overlay was utilized for an elevation display and a course line overlay for an azimuth display, each representing the predetermined aircraft flight path in the corresponding plane.

While the copending application provides a basic technique for electronically generating a cursor line representing signals, this basic technique being incorporated into the present invention, certain disadvantages and limitations are inherent in the specific mechanizations shown therein. One disadvantage is that the varying signal, or sawtooth signal, which is to be compared with the fixed signal must vary in amplitude over a considerable range corresponding to the angle range to be scanned. This means that the representation of small angles necessitates the handling of relatively small amplitude signals and consequently requires the comparison, through the pick-off circuit, of such small signals.

The necessity of handling such small amplitude signals may result in errors due to drift as well as inaccuracies due to the fact that certain nonlinear or unidirectional devices required for comparison, such as diodes, do not function properly for small signals.

Another disadvantage inherent in the particular embodiments illustrated in the copending application is that transient or noise signals which may occur remain uncancelled and appear as output signals, being then confused with pulses representing points on the cursor line.

Thus it may be stated that the embodiments shown in the copending application, utilizing but a single saw-tooth generator, are inherently unbalanced.

A further disadvantage of the single signal generator system of the copending application becomes apparent when this system is utilized to generate both glidepath and course cursors in an elevation and azimuth scanning system. In this situation a problem arises due to the fact that the comparison between the varying signal and the fixed signal must produce output pulses which occur at successively earlier times during respective range-gated intervals during azimuth scans, where the antenna is positioned at the left of the runway position; but must produce output pulses at successively later times during elevation scanning periods.

In the embodiment shown in the copending application this problem is solved by inverting the varying angle signal during elevation scanning intervals. In this manner a signal of decreasing amplitude in time results which may be compared with a fixed signal to produce pulses at successively later time intervals. It will be apparent from the detailed discussion which follows that this inversion operation is not necessary according to the present invention.

Finally, the arrangement of the copending application is limited in the accuracy which is obtainable at the point of coincidence where the varying signal crosses the fixed signal with but a slight rate of amplitude variation. In this situation the pick-off circuit of the copending application cannot provide an accurate coincidence pulse indicating the corresponding point on the cursor line.

These disadvantages of the cursor generator of the copending application are obviated through the improvement of the present invention which provides a method of doubly variable signal comparison. According to the method of the present invention both the varying angle-representing signal and the cursor line representing signal are time-varying signals, or sawtooth signals. The angle-representing signal, however, has a variable maximum excursion whereas the cursor line signal, while varying in time, has a fixed maximum amplitude during successive range-gated periods during which the cursor line pulses are generated.

The cursor line representing pulses are then obtained in a manner similar to the basic concept of the copending application through the detection of amplitude coincidence in time between the cursor line representing signal and the variable maximum amplitude angle representing signal. The doubly variable signal comparison, however, provides a simple technique of obviating the disadvantages of the system of the copending application.

Since both signals to be compared are time-varying signals, the problem of small amplitude signals may be avoided by referencing the comparison to a moderately large initial sawtooth amplitude considered to be the smallest angle. Thus small angles may be considered to be small differences between the angle-representing time-varying signal and the fixed maximum amplitude time-varying signal representing the cursor line. In this manner a considerable variation in angle range may be allowed without resorting to inaccurate small signal comparisons.

The problem of unbalanced noise or transient signals is overcome according to the present invention by utilizing a balanced amplitude comparator circuit to detect the equality or amplitude cross-over point between the angle-representing signal and the cursor-line-representing signal. Noise or transient signals received by both time-varying signal generators are then effectively cancelled in the amplitude comparator circuit which effectively only detects a change in the sense of the difference between applied input signals. A balanced amplitude comparator circuit of this type is described and claimed in copending U.S. patent application Serial No. 462,654, for "Differential Amplifier" by Lawrence Michels, filed October 18, 1954.

The doubly variable signal comparison technique of the invention introduces a factor of versatility which is evidenced, by way of example, in the time-shared azimuth and elevation system. Since both signal generators utilized are time-varying, they may be selected to have similar characteristics and be utilized interchangeably to provide a variable maximum amplitude angle-representing signal. Thus it is not necessary to invert one of the sawtooth signals as in the system by Green et al., since interchanging the time varying signals has the effect of a signal inversion after an appropriate fixed signal offset has been introduced, and the proper amplitude variations are utilized.

The present invention therefore obviates the necessity of handling small amplitude signals, provides a balanced system where noise and transients are cancelled, allows versatility in utilization without special circuits such as inverters, and achieves a sharp definition in pulse coincidence through the utilization of the amplitude comparator of the copending application by Michels in a doubly variable signal generator system.

In its basic circuit arrangement the invention comprises a pair of time-varying or sawtooth signal generators which receive a maximum amplitude representing angle or cursor line signal through respective input means and are actuated for periodic operation by applied range-gate signals. The time-varying signals produced by the generators are passed through offset circuit means, introducing the necessary fixed initial conditions, and are then compared in an amplitude comparator circuit which produces output pulses occurring during respective range-gated time intervals at times representing the range of the corresponding cursor point at the particular angle of scan.

The versatility of the doubly variable signal comparison operation of the invention is demonstrated in a system arrangement where the same signal generators are utilized for azimuth course line representation, both for left and right of runway conditions; and for elevation glidepath line representation. In this arrangement the respective input means for the variable signal generators includes the necessary switching elements for presenting the proper angle or cursor line representing signals.

Where the same generators are utilized to produce cursor lines for both elevation and azimuth scans, the offset means includes at least one variable offset circuit which may be utilized to introduce either a distance-to-touchdown signal for elevation scans or a distance-to-runway signal for azimuth scans.

In a typical situation, then, the switching elements are operable to present a fixed course line angle signal to the first signal generator, thereby producing a time-varying but fixed maximum amplitude output signal, and to present a varying angle-representing signal to the second signal generator, during azimuth left-of-runway scans; and are operable to present the varying angle-representing signal to the first signal generator and a fixed glidepath angle signal to the second signal generator, during elevation scans.

The azimuth switching elements are arranged as a double-pole double-throw switch where both left and right of runway cursor generation is desired and therefore may present a varying angle-representing signal to the first signal generator and a fixed distance-to-runway signal to the second signal generator, as well as the reversed situation introduced above for the left-of-runway application.

Accordingly, it is an object of the present invention to provide a method and apparatus for producing pulses representing a cursor line, where small angles need not be represented by small signals, obviating the errors inherent in systems requiring such signals.

Another object is to provide a doubly variable signal comparison for generating pulses representing a cursor line where transient or noise signals are cancelled in a balanced comparison operation.

A further object is to provide a doubly variable signal comparison method and apparatus of a versatile nature which may be utilized to represent azimuth course lines for either left or right of runway conditions as well as elevation glidepath lines, without the necessity of additional circuit components, such as inverters or the like.

Still another object is to provide a balanced cursor signal generator system wherein an accurate comparison is performed to produce pulses representing corresponding points on a cursor line.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 1a is a composite set of space diagrams illustrating three typical situations where the invention may be employed;

Fig. 1b is a composite set of waveforms illustrating the operation of the invention in generating pulses representing the space situation in Fig. 1a;

Fig. 1c is a representation of an AZEL display showing course and glidepath lines generated in the operation illustrated in Fig. 1b;

Figure 1:
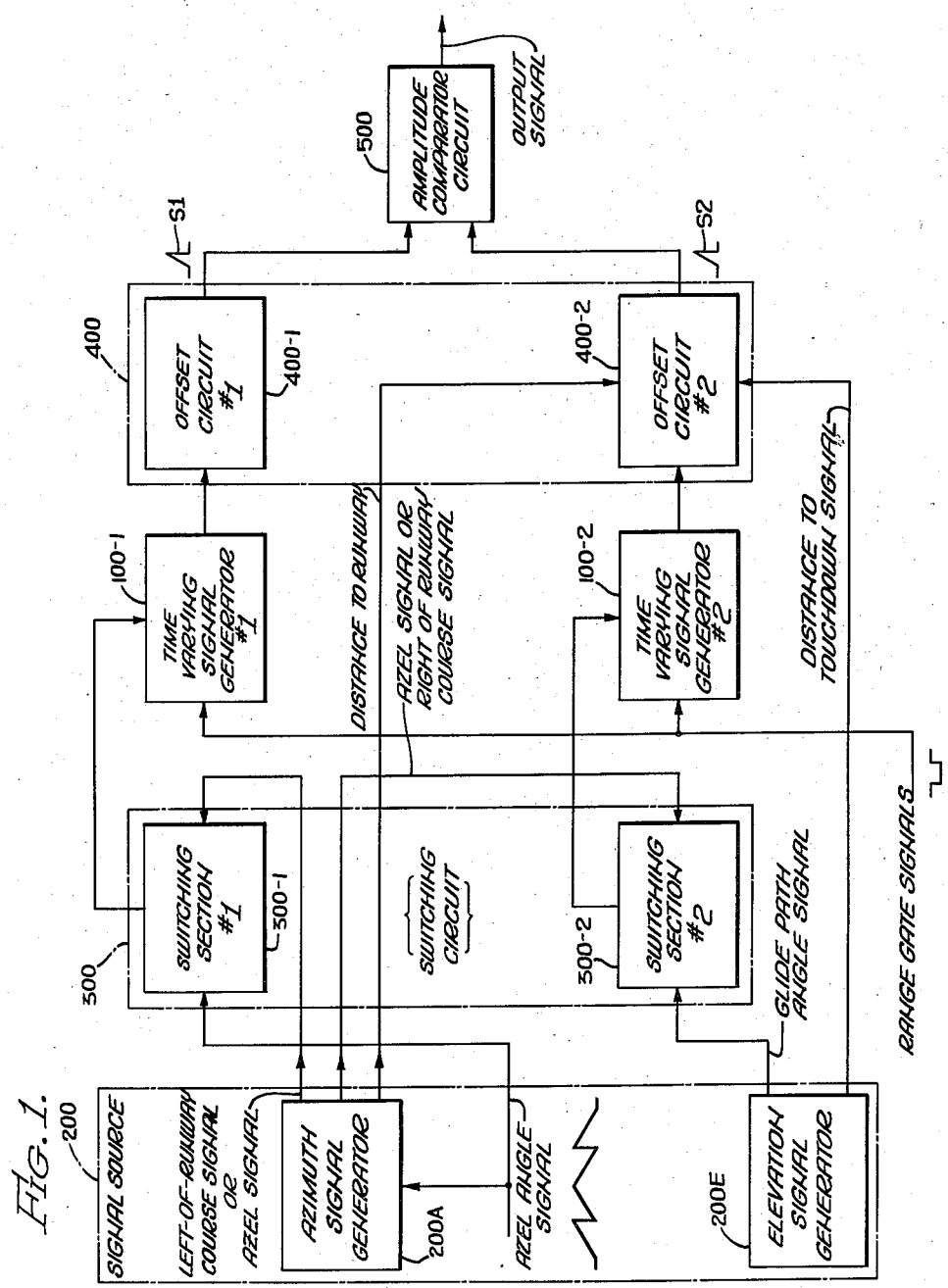
Fig. 1 is a block diagram indicating one arrangement of the invention.
Figure 2B:
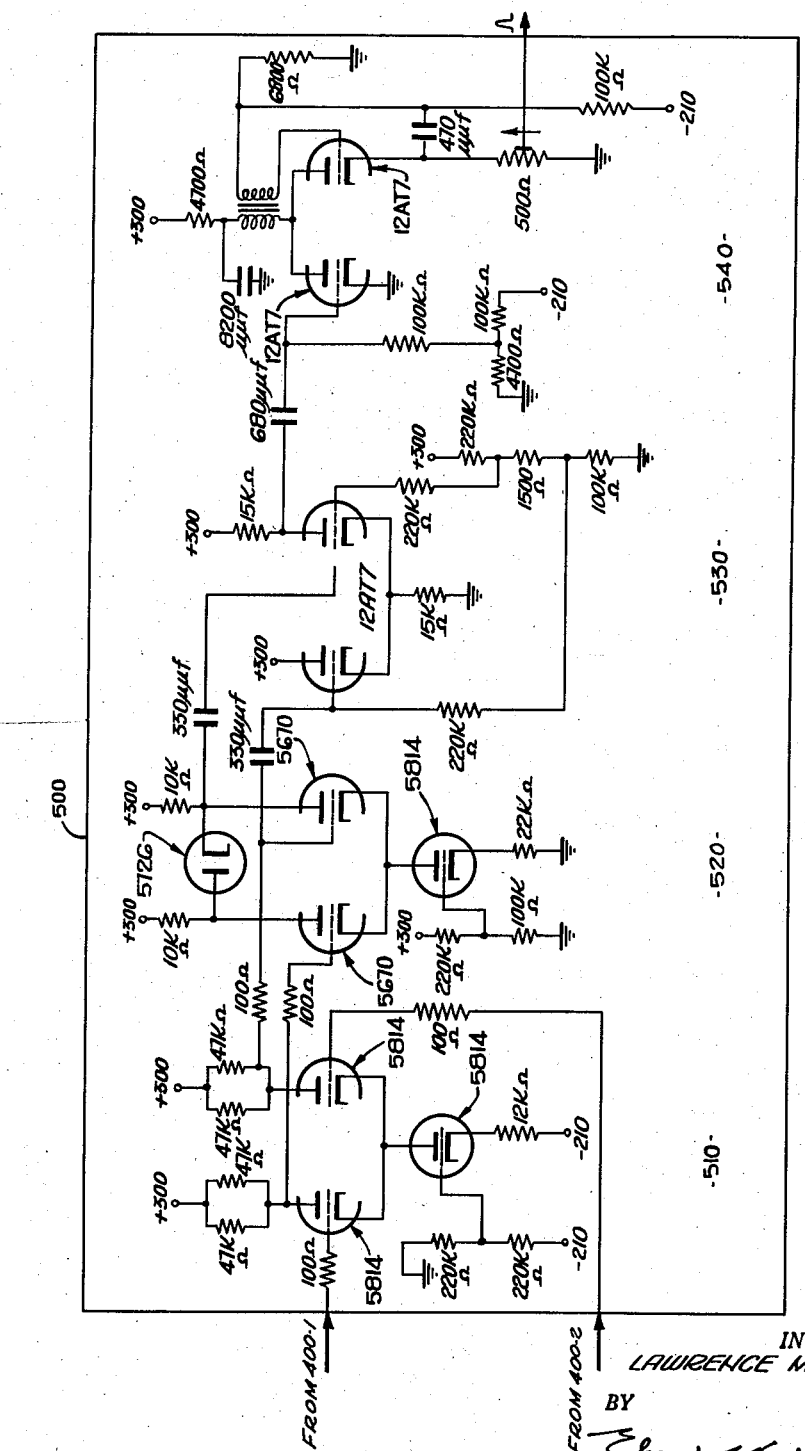

Figs. 2a and 2b together form a schematic diagram illustrating a specific form which the embodiment of Fig. 1 may assume.

Reference is now made to Fig. 1 wherein a circuit for generating pulses in accordance with the doubly variable signal comparison method of the invention is shown in block diagram form. As indicated in Fig. 1 the embodiment includes first and second time-varying signal generators 100–1 and 100–2 which are indicated to receive certain input signals produced by a source 200; the input signals being received by circuits 100 through a switching circuit 300 including switching sections 300–1 and 300–2 associated with circuits 100–1 and 100–2, respectively. Circuits 100 are actuated by range gate signals to generate the time-varying signals during corresponding periods; the amplitudes of the time-varying signals being determined by the input signals received through switching circuit 300.

The output signals produced by generators 100 are applied to an offset circuit 400 which also receives certain signals produced by source 200 and produces output signals S1 and S2 which are time-varying signals offset by an amount specified by the signals received from source 200. Signals S1 and S2 then are applied to an amplitude comparator circuit 500 which produces an output pulse each time a cross-over in amplitude occurs between time-varying signals S1 and S2.

Though the invention is not so limited, a particular utilization of the invention is indicated in Fig. 1 as well as in associated Figs. 1a, 1b and 1c, where three types of cursor lines are to be represented. In one situation an elevation glidepath line is to be represented as a corresponding series of pulses occuring during respective range-gated intervals at times, after the beginning of respective intervals, representing the range of a point on the line at a particular scan angle which is varied in a track-while-scan operation. Thus in this situation source 200 may be assumed to include an elevation signal generator 200E producing a glidepath angle signal and a distance-to-touchdown signal.

The glidepath angle signal determines the amplitude of one of the time-varying signals being applied, for example, through switching circuit 300-2 to the amplitude control input circuit of signal generator 100-2. The distance-to-touchdown signal determines the amount of offset between the signals S1 and S2 and is therefore applied to offset circuit 400; being specifically illustrated, by way of example, as applied to an offset section 400-2 therein. In this manner the glidepath line in the elevation plane is specified. In addition, a varying amplitude angle-representing signal is applied to the other signal generator 100-1, during elevation scans, through switching section 300-1. The varying angle signal, designated as signal AZEL, is utilized for both azimuth and elevation scanning and the elevation variation thereof is used to amplitude modulate the signal produced by generator 100-1. The resulting signal then has a maximum amplitude which represents the then present value of the elevation scan angle, as will be more fully understood when Figs. 1a and 1b are considered below.

In a similar manner two types of azimuth cursor lines may be represented. In one case the variable scanning angle passes through an origin point considered to be in a left-of-runway position and, in the other case, the origin point is considered to be in a right-of-runway position. In the azimuth scanning situation a signal generator 200A provides a distance-to-runway signal indicating the space between an azimuth course line and the origin point and also produces a course signal indicating the azimuth angle of the course line, the angle being measured from a convenient reference such as a line parallel to the runway.

It will be noted that generator 200A has two output leads indicated to bear the signals: left-of-runway course signal or AZEL signal, and AZEL signal or right-of-runway course signal. This designation is intended to indicate that where one output lead provides a course signal, the other output lead provides an AZEL signal and that these signals are reversed in changing the runway position.

Thus during azimuth scanning, in the left-of-runway position the uppermost lead of generator 200A produces the course signal and the next lead produces the AZEL signal; whereas in the right-of-runway position the upper lead produces the AZEL signal and the next lead produces the course signal. Essentially, the change from the signal representation of one runway position to the other is a double-throw double-pole switching operation.

A space representation of the three situations is indicated in Fig. 1a where it will be noted that in each case the solid line represents the cursor line in space. Thus in elevation the cursor line is a glidepath line corresponding to the ideal flight path of an aircraft for landing. A distance to touchdown is indicated corresponding to the space between the desired landing point and the location of the scanning station considered to be at an origin point O. In each situation the dashed lines represent the variable scan angle position which may correspond to the angle of a radar scanning beam. The angle may be referenced in any convenient manner as for example a zero angle representing horizontal scan in elevation and a zero angle representing a scan parallel to the runway in azimuth.

It will also be noted in Fig. 1a that the azimuth scanning may occur in either of the two situations indicated above. In the left-of-runway scanning operation the variable scan angle intersects the course line, representing the ideal aircraft flight path, at successively decreasing range intervals. In the right-of-runway scanning operation, on the other hand, the variable scan angle intersects the course line at successively increasing range intervals. This is the situation referred to above where the previous technique has been to invert the variable scan angle representing signal in order to handle both possibilities.

It will be noted that the range variation of points along the cursor line in the elevation scanning situation and in the azimuth right-of-runway scanning situation are similar and, it will be shown, may be represented in a similar manner by comparing two time-varying signals. On the other hand, the left-of-runway azimuth scanning situation is effectively the inverse situation. Thus it will be noted that in the elevation scanning situation and azimuth right-of-runway scanning a variable scan angle is represented as the lines S1, which are simulated by variable maximum amplitude time-varying signals S1 as will be further discussed with reference to Fig. 1b below. The fixed cursor angle in these cases is represented by a line S2 simulated by the fixed maximum amplitude, time-varying signals S2 shown in Fig. 1b.

The inversion required to perform the left-of-runway scanning operation then is achieved, according to the present invention, by interchanging signals S1 and S2 as indicated in Fig. 1a. Thus the modulated time-varying signals S2 represent the variable scan angle, and signal S1 represents the course line angle. It will also be noted that the arrangement of the invention permits a variable offset to be introduced at all times into the line, or corresponding signal S2 since this line or signal is always offset in the same sense from the line or signal S1.

Thus offset section 400-2 may be a variable offset circuit suitable for introducing signals representing either the distance to touchdown, for elevation scanning, or the distance to the runway, for azimuth scanning. It will also be noted that circuit 400 may include a fixed offset circuit 400-1 selected to allow a greater variation in the variable offset signal provided by section 400-2. It will be understood, however, that the invention may be practiced with either sense of offset where, for example, signal S1 is variably offset in the opposite sense from signal S2.

The manner in which the space situation of Fig. 1a may be simulated in time through the comparison of two time varying signals is indicated in Fig. 1b. In this figure it is assumed that both azimuth and elevation scanning are to be formed in a time-shared manner where successively increasing azimuth and elevation scans are performed, and then successively decreasing azimuth and elevation scans are performed. The manner in which the time-shared azimuth and elevation scanning may be achieved is covered elsewhere and will not be considered here. Reference, for example, should be made to Patent 2,649,581 for "Single Scope Two Coordinate Radio Systems" by H. G. Tasker et al., where the general technique of providing a time-shared display is described. It will be understood, however, that the present invention may be practiced in either azimuth or elevation separately and need not be utilized in a time-shared system.

In Fig. 1b it is assumed that the azimuth scanning is made from the left-of-runway position throughout. An attempt has been made therein to show the appearance of range-gated, time-varying signals S1 and S2. However, it will be understood that actually such signals occur with such rapidity that it would be impossible to show them clearly on the same scale with the AZEL signal. For example, the range-gated interval may be on the order of 123 microseconds for a 10-mile scan, whereas the period of an increasing azimuth scan may be in the order of magnitude of ¼ second. Thus approximately 460 time-varying signals may occur during a typical azimuth or elevation scanning period in one direction.

It will be understood, then, that the signals shown in Fig. 1b are simply expanded samples taken at various time intervals during a typical scanning operation. Referring then specifically to the signals S1 and S2 occurring during the increasing interval of azimuth scan, it will be noted that at the beginning of the interval the variable maximum amplitude signal S2 appears to vary at the same rate as the fixed maximum amplitude signal S1 and is offset therefrom by an amount corresponding to the distance-to-runway signal. Thus no amplitude cross-over occurs and consequently comparator circuit 500 produces no output pulse. This situation corresponds to the space situation indicated in Fig. 1a where the scanning angle is parallel to the course line or runway.

As the scanning angle increases, however, the maximum amplitude of variable signal S2 increases and amplitude cross-overs then occur during successively earlier times in respective range-gated intervals. Each amplitude cross-over results in a pulse being produced by circuit 500 at a time after the beginning of the respective range-gated interval which is a measure of the range from the origin point to the particular point on the course line.

The display presentation which this operation provides is found in Fig. 1c where radial lines are indicated showing the deflection path of the cathode ray tube beam. It will be understood, of course, that these lines are not actually displayed. The horizontal deflection of the beam corresponds to range so that an intensified spot appears at a horizontal distance from the origin corresponding to the time of occurrence of an amplitude cross-over point as detected in comparison circuit 500. A typical example of the relationship between a point on the azimuth display shown in Fig. 1c and a corresponding amplitude cross-over point shown in Fig. 1b is found by comparing the cross-over point X in Fig. 1b with the spot X on the azimuth display of Fig. 1c. The cross-over point X occurs approximately during the center of the azimuth scanning cycle and results in an output pulse occurring approximately during the center of the corresponding range-gated interval. If it is assumed that the total range interval represents 10 miles, then, the cross-over point occurs at 5 miles and consequently the point in Fig. 1c is shown as an intensified spot at 5 miles where the azimuth scanning angle is approximately halfway between the minimum and maximum value.

When the AZEL signal changes to elevation, a switching inversion is performed so that signal S2 is no longer varied in accordance with amplitude of the angle signal but rather becomes a fixed glidepath angle signal and signals S1 then become the modulated amplitude signals. This then allows the system to generate cursor pulses after successively increasing time intervals without the necessity of an inverter, as has been previously required. A typical cursor pulse is also illustrated in Figs. 1b and 1c as the pulse Y and corresponding intensified spot Y; illustrated as occurring approximately halfway between the minimum and maximum elevation scanning angles at approximately 5 miles.

The operation of the system is similar during the periods of decreasing scan angle where the variable angle signal initiates at its maximum amplitude and then decreases during successive periods to its minimum value.

An important thing to note about the method of the invention is that small or zero angles need not be represented by corresponding small amplitude time-varying signals. The doubly variable comparison technique requires only that the difference between the time-varying signals be properly selected. In other words, the zero-representing angle may be moderately large provided that a corresponding increase is made in the other time-varying signal of the pair. Thus, while the AZEL signal may vary between such values as 0 and 50 volts, the time-varying or sawtooth signals S1 and S2 may exist in a different range such as 15 through 180 volts, as will be more fully understood when the schematic arrangement of Fig. 2 is considered.

Although a wide variety of specific circuits may be utilized in practicing the invention, a particular arrangement is shown in Fig. 2, as a preferred embodiment. Referring now to Fig. 2, it is noted that azimuth signal generator 200A includes a potentiometer voltage divider circuit 210a providing a course signal which may be adjusted to represent the desired course line angle for either the left or right of runway situation. Particular circuit values for course signal generator 210A are indicated and are suitable for a system where the angle azimuth variation may exist in the range $-5°$ to $+15°$ and where the angular variation is represented by the voltage range of 0 to 50 volts.

The course signal is applied to one input terminal of a double-pole double-throw switch 220A which also receives the AZEL signal applied to another input terminal. As indicated, the upper position of switch 220A corresponds to the left-of-runway situation and the lower position of switch 220A corresponds to the right-of-runway situation. Thus it is noted that the uppermost output lead of circuit 200A receives the course signal when switch 220A is in the left-of-runway position and the next output lead of generator 200A receives the AZEL signal. When switch 220A is changed to the right-of-runway position the upper output lead receives the AZEL signal and the next output lead receives the course signal. Azimuth signal generator 200A also includes a distance-to-runway source 230A which is also indicated to be a potentiometer voltage divider. A particular arrangement of the circuit 200A is indicated where a switch $AZ_1$ is included which is closed during each azimuth scanning period so that the distance to runway signal appears at the output lead circuit 230A only during these periods.

The particular circuit values in circuit 230A have been selected for a system where the distance to runway may vary in the range 300 to 2000 feet.

In a similar manner elevation signal generator 200E includes two sources 210E and 220E each being indicated as a potentiometer voltage divider. The particular circuit values indicated therein have been selected for an elevation scanning operation in the range $-1°$ through $6°$ where the voltage representation of these angles exists in the range 2 to 52 volts. It will be noted that circuit 210E produces the glidepath angle signal and circuit 220E produces the distance-to-touchdown signal.

A suitable form for switching sections 300–1 and 300–2 is indicated where effectively each section includes two cathode followers which are made operable when the corresponding switch $EL_1$ or $AZ_1$ is closed. Thus in circuit 300–1 cathode follower 310–1 is operative to produce an amplitude control signal for sawtooth generator 100–1 representing the elevation portion of the AZEL signal when switch $EL_1$ is closed. In a similar manner circuit 300–1 includes a cathode follower 320–1, which is operative to produce a signal controlling the amplitude of sawtooth generator 100–1 corresponding to the azimuth signal portion of the AZEL signal when switch $AZ_1$ is closed.

Suitable circuit values are indicated in switching sections 300–1 and 300–2 to provide sawtooth amplitude variations which are effectively an expansion of the AZEL signal variations obviating the necessity of comparing small amplitude signals as discussed above.

A suitable form for signal generators 100–1 and 100–2 is indicated where in most respects the circuits are conventional linear sawtooth generators with bootstrap compensation. Thus in referring to circuit 100–1 it is noted that the sawtooth generator includes an integrating capacitor C101 receiving charging current through a bootstrap diode D101 and a charging resistor R101. The period of the sawtooth signal generator is controlled through gating pentode P101 which receives the range gate signal through an input capacitor C103 developing a signal across grid load resistor R103.

The signal developed across capacitor C101 is passed through a cathode follower stage 105 producing an amplitude modulated sawtooth output signal in accordance with the switching signal derived through circuit 300–1.

This signal is fed back through a bootstrap capacitor C105 to resistor R101 in the conventional manner.

An important variation in circuit 100–1 is that the amplitude modulating potential applied to bootstrap diode D101 also is applied through a resistor R107 to the screen grid of pentode P101. In addition, a diode D107 is coupled in parallel to capacitor C101 and to the anode of pentode P101, the operation of this arrangement being to stabilize the potential across capacitor C101 at a fixed initial value prior to the beginning of a range-gated interval.

The initial signal value is stabilized because any change in potential due to variations in the source results in a similar change in potential at the screen grid of pentode P101 changing the impedance of this tube by an amount which is just sufficient to allow an offsetting change in current through diode D107. This current change is just sufficient to maintain the voltage across capacitor C101 substantially fixed. This stabilization arrangement, however, has no effect when the amplitude of the signal derived through switch 300 is varied at the AZEL signal rate. Suitable circuit values for achieving the desired operation are indicated in similar circut 100–2.

The output sgnals produced by generators 100–1 and 100–2 are applied respectively to offset circuits 400–1 and 400–2. Offset circuit 400–1 is indicated to be a fixed offset circuit where a predetermined potential is derived through a resistance network and combined with the sawtooth signals produced by circuit 100–1. Particular circuit values are indicated in circuit 400–1 for providing a negative offset signal of approximately −14 volts. This negative offset voltage allows a convenient manner of achieving either a positive or negative offset through offset signals of positive value applied to circuit 400–2, since these signals may be less than or greater than the fixed negative offset signal of 400–1.

Circuit 400–2, it will be noted, includes two switching diodes conveniently provided through tube type 5726 which receive the course signal and distance-to-runway signal respectively. In other respects circuit 400–2 is similar to 400–1 in the manner in which the sawtooth signal of circuit 100–2 is combined with the signal applied through a respective diode. It will be understood, however, that both offset circuits may be made variable or that circuit 400–1 may be variable and 400–2 fixed.

The signals provided by offset circuits 400–1 and 400–2 are applied to opposing input circuits of a differential amplifier stage 510 in amplitude comparator circuit 500, shown in Fig. 2b. The signals produced by stage 510 are then applied to opposing input circuits of a second stage 520 which includes a diode or other non-linear element, indicated to be tube type 5726 in a suitable arrangement. Stage 520 provides a sharp signal change at the crossover point between signals S1 and S2 as offset through circuits 400–1 and 400–2. The particular manner in which circuit 520 operates is more fully described in my above-mentioned copending application entitled "Differential Amplifier."

The crossover signal change is then further amplified in a stage 530 and applied to a blocking oscillator stage 540 which produces the output marking pulses utilized to control a display such as indicated in Fig. 1c.

While the circuit of Fig. 2b forms no part of the present invention, being fully described and claimed in the copending application, it has certain particular features which provide an important contribution to the functioning of the combination of the present invention. One important thing to note is that the offset signals S1 and S2 are applied to opposing input circuits of successive differential amplification stages and therefore any transient or noise signals received by both of signal generators 100 tend to be cancelled in the operation of these differential amplifiers.

Furthermore, the utilization of stage 520 to provide a sharp crossover point indication is extremely important since it allows the accurate representation of cursor line points where both sawtooth signals S1 and S2 have a relatively large amplitude and the crossover point therebetween occurs with but a slight change in amplitude therebetween.

It will be understood, however, that the invention may be practiced with other types of amplitude comparator circuits although that shown herein is preferred.

From the foregoing description, it should be apparent that the present invention provides a method and apparatus for generating pulses representing a cursor line where small angles need not be represented by small signals; transient or noise signals are substantially cancelled out in a balanced comparison operation; where versatility is inherent in the arrangement, making it possible to simulate a considerable number of conditions; and where in the comparison performed provides pulses accurately representing the corresponding points on the cursor line.

While the invention has been described with particular regard to a situation where azimuth and elevation scans are performed and the cursor line represents either a glidepath in elevation or course line in azimuth, it will be understood that a multitude of other utilizations are possible where different flight paths are represented and where different types of scanning are contemplated.

It should also be understood that while particular means of the invention have been indicated in a general form in Fig. 1 of this description, other arrangements of means are possible without departing from the spirit of the invention. For example, the offset means may be considered as combined as part of the time varying signal generators, or the switching circuits may be omitted where it is not necessary to generate several types of cursor line representing pulses. Other modifications will be apparent to those skilled in the art.

What is claimed is:

1. Apparatus for generating pulses representing a cursor line, where each pulse is produced during a respective range-gated time interval, the time of occurrence of a pulse after the beginning of the interval corresponding to the range of a point on a predetermined aircraft flight path from an origin point on an angle reference line, said apparatus comprising: first means for producing, during each range gated interval, a first time-varying signal representing the cursor line, second means for producing, during each range-gated interval, a second time-varying signal having a variable maximum amplitude representing a corresponding variable position of a scan angle passing through the origin and referenced to the reference line, third means coupled to one of said first and second means for introducing an offset signal corresponding to the distance between the cursor line and the origin point, and fourth means responsive to said time-varying signals offset by said offset signal for producing an output pulse representing a point on the cursor line upon each occurrence in time of an equality in amplitude therebetween.

2. The apparatus defined in claim 1 wherein the cursor line is a course line representing the predetermined aircraft flight path in the azimuth plane, said third means introducing an offset signal representing the distance between the course line and an azimuth reference line.

3. The apparatus defined in claim 1 wherein the cursor line is a glidepath line representing the predetermined aircraft flight path in the elevation plane, said third means introducing an offset signal representing the distance between the glidepath line and an elevation reference line.

4. The apparatus defined in claim 1 wherein said cursor line may represent either a course line in azimuth or a glidepath line path in elevation, said apparatus further including switching means for presenting a course line indicating signal to said first means during azimuth scan, and a variable angle scan signal during elevation scans;

said switching means further including means for presenting said variable angle signal to said second means during azimuth scans and an input signal representing said glidepath line during elevation scans; said third means being operative to offset said first signal to represent the distance between the course line and the reference line during azimuth scans and being offset to represent the distance between the glidepath line and the reference line during elevation scans.

5. A doubly variable signal comparison circuit for generating pulses representing a cursor line, where each pulse is produced during a gated time interval, the time of occurrence of a pulse after the beginning of the interval representing the distance, from an origin point, of a predetermined flight path point, where the position of the point is also specified by a line passing through the origin point and reference to a base angle line, said circuit comprising: first and second time-varying signal generators actuable to produce periodic signals during respective gated time intervals, means for modulating the amplitude of one of said time-varying signals in accordance with the fixed angular position of the cursor line, means for variably modulating the amplitude of the other time-varying signal in accordance with the varying angular position of the line passing through the flight path point, offset means for displacing said time-varying signals by an amount representing the space displacement between the course line and the base angle line, and amplitude comparator means responsive to said displaced and modulated time-varying signals for producing an output pulse upon each amplitude time coincidence between said time-varying signals, as offset.

6. The circuit defined in claim 5 wherein there is further included switching means for coupling said means for modulating to said first and second time-varying signal generators, respectively, said switching means being actuable to interchange the coupling between said modulating means and said signal generators, allowing the production of pulses after successively increasing time intervals as well as after successively decreasing time intervals.

7. A balanced circuit for generating cursor pulses during respective range-gated time intervals, the time of occurrence of each pulse representing a distance between an origin point and a point in a predetermined flight path, the position of the point being measurable as an angle referenced to a base line, said generator comprising: first and second signal generators for producing first and second sawtooth signals having periods corresponding to the range-gated time interval; means for establishing the maximum amplitude of one of said sawtooth signals to represent the angle of the flight path line; means for varying the maximum amplitude of the other sawtooth signal to represent the angle referenced to the base line, means for adding a fixed amplitude signal to one of said sawtooth signals to produce a modified sawtooth signal, the fixed amplitude signal representing the displacement between the flight path line and the base line; and means for performing a balanced comparison between the sawtooth signals to produce the cursor pulses during respective range-gated time intervals upon each occurrence of equality therebetween; transient and noise signals being thereby eliminated in the balanced comparison of the two sawtooth signals.

8. In a ground-controlled approach system where a predetermined flight path is to be represented as a series of points along a course line in azimuth and along a glidepath line in elevation, the scanning beam in the system being offset from the runway by an amount represented by a distance-to-runway signal and being offset from the flight path touchdown point by an amount represented by a distance-to-touchdown signal, the course line and glidepath line angles being represented by course and glidepath signals, respectively, and the angle of the beam being represented by a beam angle signal; a doubly variable signal comparison circuit for generating pulses representing either the course line or the glidepath line, where the alternate representation may be achieved without signal inversion, said circuit comprising: first and second sawtooth generators, each including amplitude control means; switching means for applying the course and beam angle signal to respective amplitude control means of said generators during azimuth scanning periods and for applying said glidepath signal and said beam-angle signal to respective amplitude control means during elevation scanning periods; means for offsetting said sawtooth signals by amounts corresponding to said distance-to-runway and distance-to-touchdown signals during azimuth and elevation scans, respectively; and comparison means responsive to said sawtooth signals as offset for producing an output pulse upon each amplitude coincidence occurring therebetween.

9. Apparatus for generating pulses representing a cursor line where each point on the line may be designated by a scan angle measured between a scan line through an origin point and a reference line, and a range measured along the scan line, said apparatus comprising: first and second signal generators for producing signals which periodically vary at predetermined relative rates; means for off-setting one of said signals in accordance with the distance between the desired cursor line and the origin point; means for modifying the rate of variation of one of said signals according to the variation of the scan angle position; means for comparing the amplitudes of said signals to determine the periodic crossover points therebetween; and means for producing a pulse each time an amplitude crossover occurs, each pulse representing a range to a corresponding point on the cursor line for the particular scan angle.

10. Apparatus for generating pulses representing a flight path, where each pulse is produced during a respective interval, the position of the pulse after the beginning of the interval corresponding to the range of a point on the flight path, measured from an origin point on a reference line, said apparatus comprising: first means for producing during each interval, a first signal varying between limits representing the flight path line, second means for producing, during each interval, a second signal having a variable maximum amplitude representing the corresponding variable position of a scan angle passing through the origin and referenced to the reference line, third means coupled to one of said first and second means for producing an offset signal corresponding to the distance between the flight path line and the origin point, and fourth means responsive to said variable signals for producing an output pulse representing a point on said flight path line upon each occurrence of an equality in amplitude therebetween.

11. A doubly variable signal comparison circuit for generating pulses representing a flight path line, where each pulse is produced during a respective period, the position of each pulse measured from the beginning of its respective period representing the distance, from an origin point, of a point on said flight path, where the position of the point may also be specified by a line passing through the origin point and referenced to a base angle line, said circuit comprising: first and second signal generators actuable to produce periodically varying signals having similar amplitude variations, means for modulating the amplitude of one of said signals in accordance with the fixed angular position of the flight path line, means for modulating the amplitude of the other signal in accordance with the varying angular position of the line passing through the flight path point; means for displacing said signals by an amount representing the space displacement between the flight path line and the base angle line; and amplitude comparison means responsive to said displaced and modulated signals for producing output pulses upon each amplitude coincidence therebetween.

12. Apparatus for generating pulses representing a cursor line, said apparatus comprising: means for producing a first time-varying signal; means for producing a second time-varying signal; means for offsetting said second time-varying signal with respect to said first time-varying signal; and means for producing an output pulse each time said first time-varying signal and said offset time-varying signal become equal to each other.

13. Apparatus for generating pulses representing a cursor line comprising: means for generating first and second sawtooth voltages; means for adding a constant D.C. voltage to said second sawtooth voltage to produce a sum voltage; and means for producing an output pulse representing a point on the cursor line each time said first sawtooth voltage becomes equal in amplitude to said sum voltage.

References Cited in the file of this patent
FOREIGN PATENTS 611,613     Great Britain _____ Nov. 2, 1948